March 4, 1958 L. R. KRASNO 2,825,492
DISPENSER ATTACHMENT FOR BOTTLES
Filed May 17, 1956
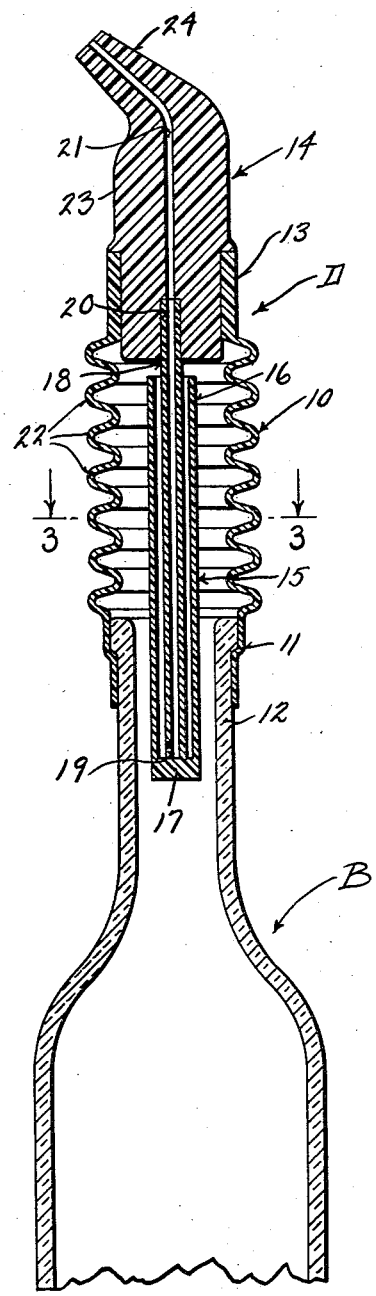
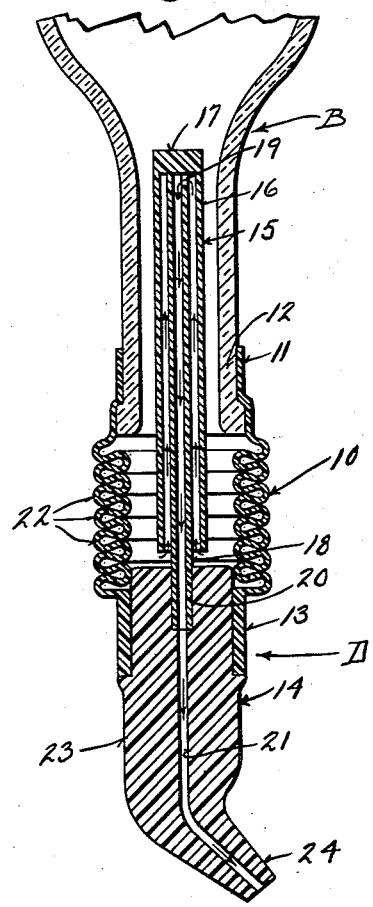
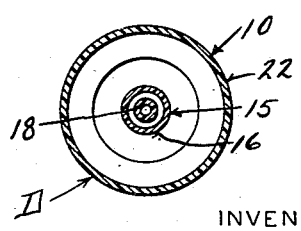
INVENTOR
LOUIS R. KRASNO
BY
ATTORNEYS

United States Patent Office 2,825,492
Patented Mar. 4, 1958

2,825,492

DISPENSER ATTACHMENT FOR BOTTLES

Louis R. Krasno, Pensacola, Fla.

Application May 17, 1956, Serial No. 585,539

4 Claims. (Cl. 222—209)

This invention appertains to dispensing and, more particularly to a new and novel dispenser attachment for fluent containers and the same represents an improvement over my prior application, Serial No. 545,273 filed November 7, 1955, and entitled Dispenser Attachment for Bottles.

As stated in my prior application, there has long been a need for a compact dispensing attachment for fluids and semifluids which is simple in construction and which will dispense a pre-determined measured amount of material and at the same time be free from complicated plungers, valves, weights and other means now necessary in measuring a desired quantity. My prior application overcame the above difficulties and is extremely simple in construction. However, in using my prior attachment for liquids, it has been found that some free flowing liquids may leak slowly from the dispenser when the bottle is inverted.

Therefore, it is a primary object of my present invention to provide a dispenser attachment which is also simple in construction and which may be readily attached to any size or shape container outlet to measure a pre-determined amount of free flowing liquid and which will not leak when the container or bottle is inverted.

Another important object of my present invention is to provide a dispensing attachment having a resilient or flexible accordion pleated pump-like section provided at one end with a restricted outlet and which has incorporated therein, means for preventing the fluid from leaking out of the bottle when the bottle is inverted.

Still another object of my present invention is to provide a novel dispensing attachment which will measure a pre-determined amount of liquid to be dispensed without the necessity of resorting to complicated plungers, valves or weight mechanisms.

A further object of my present invention is to provide my novel dispenser attachment with a cylinder and tube arrangement, the tube spaced from and within the cylinder so that when the bottle is inverted, the fluid must first flow upward before it is dispensed.

A salient feature of my invention resides in the fact that the center pump-like section may be provided with any number of accordion pleats and also the pleats may vary in size so that any pre-determined amount of fluid may be dispensed according to the attachment provided.

A still further object of my present invention is to provide a measuring and dispensing attachment for containers and bottles which causes change of pressure of the air trapped in the container when the same is inverted, the pressure in relation to the atmospheric pressure acting both to prevent leakage and to dispense the desired quantity.

Another object of my present invention is to provide one end of the pump-like section with a resilient adapter or collar so that my dispensing attachment may be attached to any size or shape of container outlet.

An important advantage of my present invention resides in the fact that once the container is inverted, my device will instantaneously and continuously dispense a measured quantity of fluid without the necessity of waiting or turning the container back to an upright position each time the desired quantity is to be dispensed.

With these and other objects in view, and to the end of attaining any other advantages hereinafter appearing, this invention consists in certain features of construction and arrangement of elements hereinafter described, pointed out in the claims and illustrated in the drawings, in which drawings:

Figure 1 is a fragmentary vertical sectional view through my novel dispenser attachment shown associated with the neck of a liquor bottle or the like, Figure 2 is a fragmentary vertical sectional view similar to Figure 1 of the drawings but showing the bottle and dispenser in its inverted position with the pump section compressed to dispense a measured quantity of fluid and, Figure 3 is a transverse sectional view through my novel dispenser, the section being taken on the line 3—3 of Figure 1 of the drawings and looking in the direction of the arrows.

Referring now to the drawings in detail wherein similar reference characters designate corresponding parts throughout the several views, the letter D generally indicates one type of my improved dispenser attachment and the same includes, broadly, a substantially barrel shaped resilient pump section 10 having an integral collar or sleeve 11 which may be attached to the neck 12 of the bottle B. The pump section also carries a thickened collar 13 to receive the dispensing outlet end 14. The dispensing outlet end may obviously be of any size or shape and also carries my novel cylinder and tube arrangement 15 which includes the large outer cylinder 16 closed at one end 17 and into which is positioned the smaller tube 18. The tube 18 has an opening 19 at its inner end and this tube may be molded integral with the outer tube or made separate and firmly secured thereto at the closed end 17 as shown. One end 20 of the tube 18 is firmly secured to the dispenser outlet end and is in communication with the outlet passageway 21.

It should be noted that in the preferred form of my invention, the cylinder and tube arrangement 15 extends longitudinally within the pump section 10 and the end 17 thereof terminates well below the sleeve so as to protrude into the neck 12 of the bottle.

The pump section 12 is made up of a series of accordion type pleats 22 and the number as well as the circumference of these pleats may be varied as desired and the number and size of the pleats will, of course, determine the desired quantity of fluid that will be dispensed from the bottle. Again it should be stressed that due to the fact that my novel dispenser arrangement is scientifically made with precision and embodies the principle of atmospheric pressure and greater or lesser atmospheric pressures of the trapped air in the bottle when the same is inverted, the exact quantity of fluid desired to be dispensed may be built into the dispenser attachment D.

For example, if my dispenser is to be utilized with bottles to dispense liquor or alcoholic beverages, it may be made so that exactly one ounce of fluid will be dispensed when the bottle is inverted and the pump section 10 is compressed as shown in Figure 2 of the drawings.

It should also be noted that the dispensing outlet end portion 14 includes a body section 23 and a curved pouring spout 24. Obviously, as stated above, the pouring spout may be straight but in the preferred form and to facilitate the pouring, I form the same curve, as shown.

The principles of operation of my novel dispenser attachment D will now be set forth in detail. Assuming that the dispenser illustrated has been built to dispense exactly one ounce of fluid and the flexible sleeve 11 has been attached to the neck 12 of the bottle B as shown, and it is desired to dispense one ounce of fluid, the bottle is first inverted and immediately the fluid will start to move in the direction of the arrows (Figure 2) and travel upwardly in the cylinder 16 around the tube 18 and then through the opening 19 where it will be conducted in the outlet passageway 21. Now, inasmuch as the air trapped in the bottle is sealed from the atmosphere, the movement of the fluid seeking its own level upward in the cylinder will cause the fluid level to diminish slightly and then the air pressure on top of the fluid within the bottle will be less than atmospheric pressure and no fluid will leak out of the pouring spout 24. Now, when the pump section and particularly the accordion pleats 21 are compressed as shown in Figure 2 of the drawings, the liquid level will move up, compressing the air trapped in the bottle and now the pressure of the air in the bottle is greater than the atmospheric pressure and the fluid will move out and be dispensed from the curved pouring spout 24. As the fluid flows out of the bottle, the inner trapped air will again equalize with the atmospheric pressure exerted on the fluid at the outlet opening of the passageway 21 and particularly upon release of the dispenser, the pressure of the air trapped within the bottle will be considerably less than atmospheric pressure and the fluid will stop flowing from the pouring spout. Again it is stressed that by varying the number of pleats or even varying the circumference of a given number of accordion pleats, the desired quantity of fluid to be dispensed can be accurately determined and built scientifically into the unit. Further, when the container is inverted, I am able to dispense the desired measured quantity instantaneously without waiting for the measuring portion to fill up as is necessary in all known prior types of measuring dispensers. Also, I may move my device in its inverted position from glass to glass without the necessity of turning the container back to an upright position and then inverting it again each time. This, of course, gives further advantages over other prior types of dispensers now on the market.

While I have shown and described my present invention in particular for dispensing liquids, it obviously can be used to dispense semiliquids or other types of material but in dispensing semifluids, such as catsup or the like, I prefer to utilize my novel dispensing unit shown and described in my above mentioned prior application.

From the foregoing, it is believed that the features and advantages of my invention will be readily apparent to those skilled in the art and it will, of course, be understood that changes in the form, proportion and minor details of construction may be resorted to without departing from the spirit of the invention or the scope of the appended claims.

I claim:

1. As a new article of manufacture, a measuring and dispensing attachment for the outlet end of fluent containers comprising, an elongated substantially barrel shaped body portion having a restricted outlet on one end and a flexible sleeve on its opposite end for attaching the article to the outlet end of a container, an intermediate accordion pleated flexible pump section, an elongated tube extending longitudinally within the pump section communicating with said restricted outlet, and a cylinder open at one end surrounding said tube for the major portion of its length, said tube having an opening within the cylinder and communicating therewith, whereby upon inverting the cylinder the pressure of the air trapped within the container will be below atmospheric pressure and fluid will not flow from the outlet end.

2. As a new article of manufacture, a measuring and dispensing attachment for the outlet end of fluent containers comprising, an elongated substantially barrel shaped body portion having a restricted outlet on one end and a flexible sleeve on its opposite end for attaching the article to the outlet end of a container, an intermediate accordion pleated flexible pump section, an elongated tube extending longitudinally within the pump section communicating with said restricted outlet, and a cylinder open at one end surrounding said tube for the major portion of its length, said tube having an opening within the cylinder and communicating therewith, whereby upon inverting the container the pressure of the air trapped within the container will be below atmospheric pressure and fluid will not flow from the outlet end, said accordion pleated section adapted to be compressed whereby the pressure of the air trapped within the inverted container will be greater than atmospheric pressure and a measured amount of fluent material will be dispensed in direct proportion to the size, diameter and number of pleats in said pump section.

3. As a new article of manufacture, a measuring and dispensing attachment for the outlet end of fluent containers comprising, an elongated body portion having a restricted outlet on one end and a flexible sleeve for attaching the article to the outlet end of a container on the opposite end of said body, an intermediate pump section, a tube communicating with said outlet end of said attachment extending through said pump section and terminating adjacent said flexible sleeve, a cylinder closed at one end surrounding said tube and extending from said end termination of said tube to a point adjacent said restricted outlet, said closed end of said cylinder closing off the end termination of said tube, and means adjacent said end termination of said tube establishing communication between said tube and said cylinder.

4. A measuring and dispensing attachment for the outlet end of fluent containers comprising, an elongated body portion having a restricted outlet on one end and a flexible sleeve for attaching the article to the outlet end of a container on the opposite end of said body, an intermediate accordion pleated flexible pump section, a tube communicating with said outlet end of said attachment extending longitudinally through said pump section and terminating adjacent said flexible sleeve, a cylinder closed at one end surrounding said tube and extending from said end termination of said tube to a point adjacent said restricted outlet, said closed end of said cylinder closing off the end termination of said tube, and means adjacent said end termination of said tube establishing communication between said tube and said cylinder.

References Cited in the file of this patent

FOREIGN PATENTS 1,050,800     France    ---------------- Jan. 11, 1954